(12) United States Patent
Savoor

(10) Patent No.: US 8,151,336 B2
(45) Date of Patent: Apr. 3, 2012

(54) DEVICES AND METHODS FOR SECURE INTERNET TRANSACTIONS

(75) Inventor: Raghvendra Savoor, Walnut Creek, CA (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 585 days.

(21) Appl. No.: 12/332,211

(22) Filed: Dec. 10, 2008

(65) Prior Publication Data

US 2010/0146614 A1    Jun. 10, 2010

(51) Int. Cl.
*H04L 29/06* (2006.01)
(52) U.S. Cl. .............................. 726/10; 380/33; 380/270
(58) Field of Classification Search .................. 713/152, 713/155–158, 168–171, 175–180; 726/2–10, 726/17–21
See application file for complete search history.

(56) References Cited

U.S. PATENT DOCUMENTS

| | | | | |
|---|---|---|---|---|
| 2002/0022483 | A1* | 2/2002 | Thompson et al. | 455/439 |
| 2005/0188193 | A1* | 8/2005 | Kuehnel et al. | 713/155 |
| 2009/0055541 | A1* | 2/2009 | Sato et al. | 709/228 |
| 2009/0073943 | A1* | 3/2009 | Krishnaswamy et al. | 370/338 |
| 2009/0187983 | A1* | 7/2009 | Zerfos et al. | 726/10 |

* cited by examiner

*Primary Examiner* — Gilberto Barron, Jr.
*Assistant Examiner* — Malcolm Cribbs
(74) *Attorney, Agent, or Firm* — Moazzam & Associates, LLC

(57) ABSTRACT

Devices and methods are disclosed which provide a mobile communications device with multiple methods of wireless communication which can use one method, such as WiFi, to connect to an independent wireless access point while using another method, such as cellular, to verify the security of the wireless access point. The wireless access point provides two SSID's: one private SSID, which is usually encrypted to prevent access, and one public SSID, which is open to any mobile communications device. The mobile communications device connects to the public SSID and downloads a digital certificate. The mobile communications device then uses its cellular connection to verify the authenticity of the digital certificate with its service provider. If verified, the mobile communications device can make use of the wireless access point.

25 Claims, 4 Drawing Sheets

DEVICES AND METHODS FOR SECURE INTERNET TRANSACTIONS

BACKGROUND OF THE INVENTION

1. Field of the Invention

The present invention relates to independent wireless access point security. More specifically, the present invention relates to securing independent access points with digital certificates which can be validated.

2. Background of the Invention

Cellular telephones are tremendously popular. It is estimated that at the end of 2007 the total worldwide subscriber rate reached 3.3 billion. Close to 80% of the world's population enjoys mobile telephone coverage, a figure that will only increase. As cellular telephones gain popularity, their functionality has increased also. Standard service includes voice calling, caller ID, call waiting, and voice mail. Service providers also offer text messaging, push mail, navigation, and even a high-speed internet connection directly to your telephone.

At the same time, people have become much more dependent on their cellular telephones. Many people no longer have traditional land-line telephones in their house, instead choosing to rely on their cellular telephone. Cellular telephones can accomplish almost everything that a land-line telephone does with the added benefit of being able to be taken with you on the go. And that is the least a cellular telephone has to offer.

Cellular telephones have become a necessity in the business world. With the fast pace of business today, people must be reachable at any time of day, every day. With cellular telephones, laptop computers, and Personal Digital Assistants (PDAs), users can easily be called or e-mailed anytime and almost anywhere. Companies have come to rely on the luxury of instant communication with their employees. Decisions can be made faster and more confidently. For the small business entrepreneur, hiring employees is not always a priority, especially in the beginning. These entrepreneurs must handle everything themselves at times, and need to stay connected to their clients. Having telephone calls, email, internet, and navigation all on one mobile device is invaluable.

New networks increase the number of areas with available service. Many newer telephones are equipped with wireless access. Wireless access points allow these telephones to connect to the internet. Ad hoc networks, such as these wireless access points, are appearing with more and more frequency as businesses and even individuals allow for secure and unsecured use. With the emergence of BLUETOOTH, areas with access to BLUETOOTH are also becoming increasingly common. Additionally, the increasing prevalence of femtocells increases areas of network availability. Femtocells connect to service providers' networks via broadband and allow service providers to extend service indoors, especially in areas of limited access. In the future, 4G networks will become prevalent as well. These networks will be the next complete evolution in wireless communications.

Meanwhile the internet itself has grown very large. One source estimates the internet in its entirety is about five million terabytes of data. The famed search engine GOOGLE is said to have only indexed about 170 terabytes of that data. Websites are hosted in many different countries around the world. The internet is used for shopping, banking, social gatherings, education, news, etc. However, as more and more people transact their business across the internet others have been thinking of malicious ways to intercept people's bank accounts, credit cards, etc.

Identity theft has become a common tactic for criminals these days, and one of the largest sources of identity theft is through the internet. Criminals will send emails disguised as a bank, credit card company, or other financial institution with links directly to their website. The website will look legitimate, but it is merely a front to collect personal information so they can turn around and assume your identity with a real financial institution. The government cannot always keep up with these crimes largely due to the sources being offshore.

Most of this can be done through a home internet connection, but usually requires some small deviation in the website address, name, or other method. For example, a criminal may want to pose as BANK OF AMERICA, which owns the website www.bankofamerica.com. In order to do this he may setup a website and register as the domain name www.loankofamerica.com or www.bankofamerica.com. The differences are subtle, and often enough to trick an unsuspecting person. The criminal will send mass emails out to everyone he can, disguised as BANK OF AMERICA, in hopes that at least one person will visit the site, assume it is legit, and enter their bank information. This all happens from the victim's own home internet connection.

As more and more wireless access points appear, people wonder how safe they are to use. Sometimes the access point is owned by a restaurant, coffee shop, corporation, etc., but sometimes it is just someone's personal access point which has been left unsecured. Ideally the access point allows unfiltered access to the internet without recordation of use, but that is not always the case. Unfortunately, an open wireless access point can leave a person more vulnerable than when using their home internet connection. Many open access points, including harmless access points, practice ethereal logging, which is another way of saying that every packet of data transfer through that access point is recorded. Some of these packets are encrypted, but some are not. A savvy hacker can root through these packets and figure out anything from visited websites to secret passwords. Ethereal logging is somewhat common, however, and rarely has malicious intent behind it. It does carry somewhat of a risk and some people feel uncomfortable knowing that every packet of data is being recorded. However, there is a much bigger danger of connecting to the internet through a random access point.

Fake Domain Name Service (DNS) tables can be used in an unsecured access point. DNS, generally, is a service that links domain names to Internet Protocol (IP) addresses. Every domain name, like www.bankofamerica.com, www.google.com, www.yahoo.com, etc., is associated with an IP address. The IP address is necessary for a web browser to locate the server on the internet which contains the desired website. Normally the access point will reference some global DNS server in order to find the IP address and connect to that server, but an access point has the capability of referencing another server, or another table to find the IP address. The problem is when someone accesses www.bankofamerica.com through an open access point, there is a potential for them to be sent to a wholly different website. What is worse is the website they are directed to will look and feel exactly like BANK OF AMERICA's website, but is really just a front to record your passwords, social security numbers, etc.

What is needed in the art is a way of ensuring the security of these random, independent access points which allows anyone to use them to conduct their business transactions without fear of identity theft or other malicious tactics.

SUMMARY OF THE INVENTION

The present invention includes devices and methods which allow a mobile communications device to trust the security of an independent wireless access point. A wireless access point is provided with two SSID's, one private and one public, and any device with the proper networking hardware can connect to the public SSID. Once connected, a mobile communications device can download a digital certificate from the wireless access point for verification. The mobile communications device uses another connection to verify the certificate with its service provider's database of certificates. If the certificate is found, the mobile communications device and the wireless access point switch to an encrypted connection.

In one exemplary embodiment, the present invention features a wireless access point comprising a housing, a memory within the housing, a wireless communication module within the housing, an antenna in communication with the wireless communication module, and coupled to the housing, a private SSID stored on the memory, a public SSID stored on the memory, and a digital authenticator stored on the memory. The second SSID may be accessed and the digital authenticator downloaded to prove the wireless access point's trustworthiness.

In another exemplary embodiment, the present invention features a wireless router comprising a housing, a memory within the housing, a wireless communication logic within the memory, an antenna in communication with the memory, and coupled to the housing, a first SSID stored on the memory, a second SSID stored on the memory; and a certificate stored on the memory. The second SSID may be accessed and the certificate downloaded to prove the wireless access point's trustworthiness.

In yet another exemplary embodiment, the present invention features a method of proving the trustworthiness of a wireless access point having a first and second SSID's comprising, connecting to the second SSID through a first connection, downloading a certificate from the wireless access point; and comparing the certificate with a database of certificates for verification of authenticity.

DETAILED DESCRIPTION OF THE INVENTION

The present invention includes devices and methods which allow a mobile communications device to trust the security of an independent wireless access point. Embodiments of the present invention provide a mobile communications device with multiple methods of wireless communication which can use one method, such as WiFi, to connect to an independent wireless access point while using another method, such as cellular, to verify the security of the wireless access point. The wireless access point provides two SSID's: one private SSID, which is usually encrypted to prevent access, and one public SSID, which is open to any mobile communications device. The mobile communications device connects to the public SSID and downloads a digital certificate. The mobile communications device then uses its cellular connection to verify the authenticity of the digital certificate with its service provider. If verified, the mobile communications device can make use of the wireless access point.

Definitions

"Mobile communications device", as used in this disclosure, refers to a portable device which is used to communicate over a wireless connection. A mobile communications device can be a cellular telephone, a personal digital assistant (PDA), a laptop computer, etc.

"Wireless access point" (WAP), as used in this disclosure, refers to a device which broadcasts a wireless signal in order to engage in two-way communication with another device. Wireless access points include wireless routers and servers, can use protocols such as WiFi 802.11b, 802.11a, 802.11g, BLUETOOTH, RF, etc., and connect devices to a network such as the INTERNET. Wireless access points are usually stationary but can be mobile.

"Digital certificate", as used in this disclosure, refers to an identification stored on a memory. Digital certificates contain information such as name and location in order to establish security. A digital certificate is often compared to a database in order to validate its authenticity.

Figure 1:
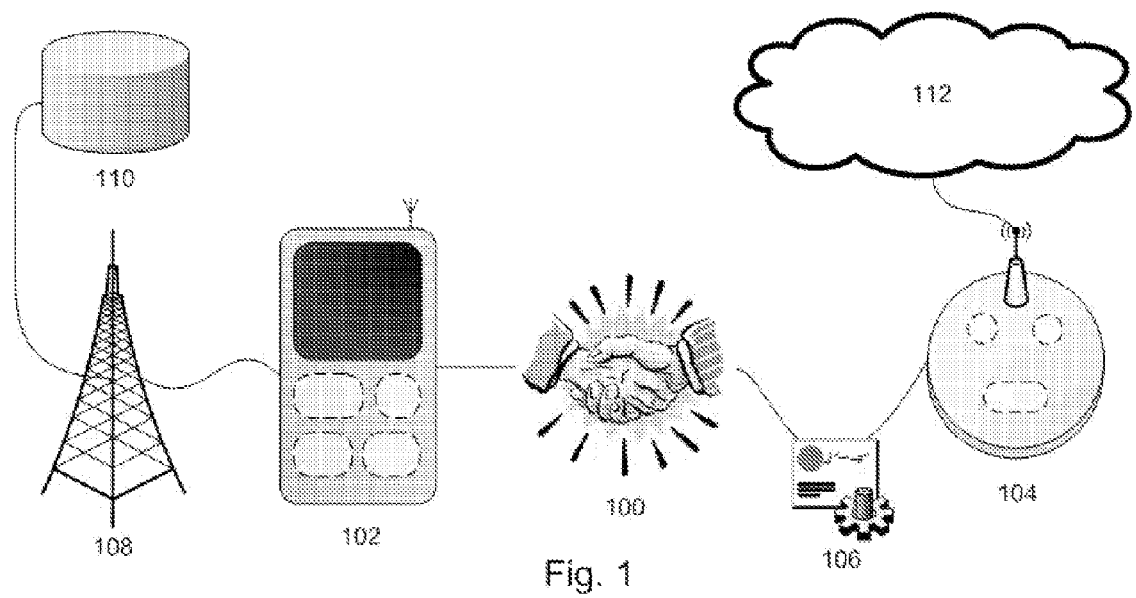
FIG. 1 shows a network system for ensuring the security of a wireless access point, according to an exemplary embodiment of the present invention.

An exemplary embodiment of the present invention, shown in FIG. 1, features a "handshake" 100 between a mobile communications device 102 and a wireless access point 104, a cellular tower 108, a digital certificate database 110, and a network 112. Mobile communications device 102 uses, among other connections, a cellular connection and a WiFi connection. Wireless access point 104 serves a WiFi connection with two service set identifiers (SSID's), and broadcasts its wireless signal for a small surrounding area. One SSID is for a private network, while the other SSID is for a public network. Mobile communications device 102 accesses the same cellular network from many locations. When mobile communications device 102 enters the broadcast area of wireless access point 104's signal, a user of mobile communications device 102 may elect to use that signal. Wireless access point 104 connects to the INTERNET. Even though mobile communications device 102 has its own connection to the internet, the connection speed through wireless access point 104 is much greater. Upon user direction, mobile communications device 102 initiates a connection with wireless access point 104. During this initiation "handshake" 100 takes place. Handshake 100 is a method of checking the security and trustworthiness of wireless access point 104. Wireless access point 104 delivers digital certificate 106 to mobile communications device 102. Once the digital certificate is downloaded, mobile communications device 102 uses its cellular connection to connect to digital certificate database 110, a database of digital certificates most likely supplied by the cellular carrier. If the same digital certificate is found in digital certificate database 110, then the wireless access point is certifiably trustworthy. The user of mobile communications device 102 can conduct transactions through wireless access point 104 without worry. If the same digital certificate is not found in digital certificate database 110, then the user of mobile communications device 102 may still connect to the internet through wireless access point 104, but may need to exercise caution and limit transactions. When attempting to connect to an untrusted wireless access point, the user is notified and prompted to confirm the connection before use is allowed.

Alternately, the mobile communications device may use a BLUETOOTH connection to access the INTERNET from another device that has a connection to the INTERNET as well as an open BLUETOOTH connection. This other device contains a digital certificate as well, which can be verified. The wireless access point may not always have a private SSID present. A wireless access point with dual SSID's is featured in copending application no. xx-xxxx, which is hereby incorporated by reference in its entirety. Just as the mobile communications device can use any connection method to connect to an access point, it can use any connection method to verify the certificate as well. However, verification through the same connection can be hazardous since this method gives the wireless access point a chance to fake the verification process, which defeats the whole purpose of security.

Figure 2:
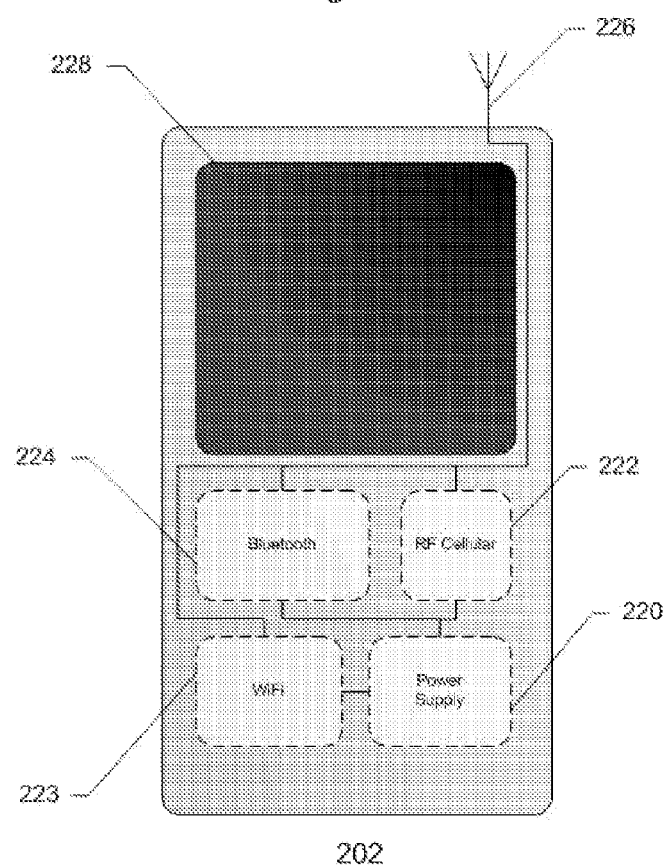
FIG. 2 shows a mobile communications device, according to an exemplary embodiment of the present invention.

An exemplary embodiment of a mobile communications device, shown in FIG. 2, features a power supply 220, a cellular connection RF module 222, a WiFi module 223, a BLUETOOTH module 224, an antenna 226, and a screen 228. Power supply 220 supplies power to the entire mobile communications device 202. Cellular connection RF module 222 enables mobile communications device 202 to communicate with nearby cellular towers. The cellular towers are connected to the rest of the cellular network, enabling a user of mobile communications device 202 to place and receive voice calls, send text messages, and make data connections i.e. connect to the INTERNET. This connection is supplied by a cellular service provider. WiFi module 223 enables mobile communications device 202 to connect to wireless access points or any other communications device featuring an 802.11x service. WiFi module 223 can only be used within the range of a wireless access point. This range is typically much smaller than the average cellular tower, and as such, WiFi module 223 may not be used as frequently as cellular connection RF module 222. However, WiFi module 223 allows a faster data connection than cellular connection RF module 222. BLUETOOTH module 224 enables mobile communications device 202 to connect to other devices featuring a BLUETOOTH service. This is a peer-to-peer connection, meaning only two devices can talk to each other at once. If a third device would like to connect, it will have to wait until the connection is broken between the first two. However, this does not mean that a connection to the INTERNET is not possible through BLUETOOTH module 224. Mobile communications device 202 can connect via BLUETOOTH module 224 to another device. This other device connects to the INTERNET through another connection, and simply shares its INTERNET connection with mobile communications device 202 through the BLUETOOTH connection. Antenna 226 is connected to each of the cellular connection RF module 222, WiFi module 223, and BLUETOOTH module 224. The antenna is coupled to mobile communications device 202, and is the local terminal for sending and receiving wireless signals. Screen 228 is the display for mobile communications device 202 which is its primary output. Screen 228 is utilized to notify user of available networks, network status, connections, etc.

Embodiments of a mobile communications device take many forms. A laptop computer with at least two methods of wireless communication is considered a mobile communications device for purposes of this disclosure. These types of wireless communication include the disclosed WiFi, cellular, and BLUETOOTH as well as other forms known to one of skill in the art. Other embodiments include a database of digital certificates located on the mobile communications device. This onboard database allows the mobile communications device to perform its own verifications without the need to establish a secondary connection and without the security issues associate with using the same connection to verify the digital certificate. The database can be refreshed from time to time using a trusted connection, such as the cellular connection with the service provider, and updated periodically with new wireless access points. However, an onboard database is not going to be as up-to-date as a service provider's database. With new wireless access points being added all the time, there is bound to be a delay between the time the service provider adds the wireless access point and the time the mobile communications device downloads a copy of the digital certificate. Furthermore, as more and more wireless access points are added the database could require a lot of memory, which could add expense as well as size to the device. Onboard databases are suitable for most laptop computers, but not every mobile telephone.

Figure 3:
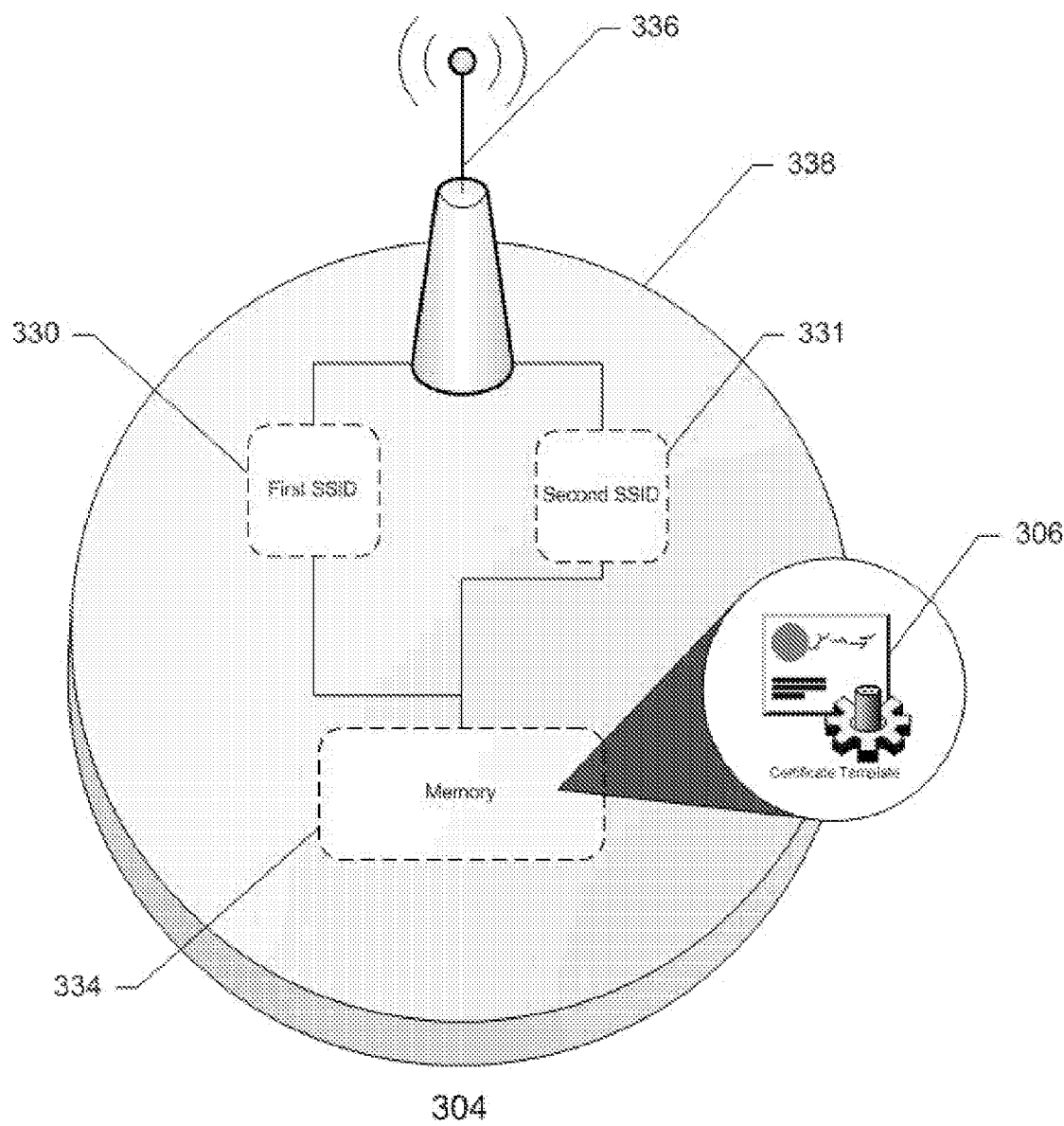
FIG. 3 shows a wireless access point with two SSID's, according to an exemplary embodiment of the present invention.

An exemplary embodiment of a wireless access point, shown in FIG. 3, features a first SSID 330, a second SSID 331, a memory 334, a digital certificate 306 located on memory 334, an antenna 336, and a housing 338. First SSID 330 is a wireless gateway that controls the connections to wireless access point 304. First SSID 330 is a private SSID with which an operator or administrator may connect, and may be a secured connection requiring a key. First SSID 330 is usually used and maintained by the owner of the wireless access point, such as a business owner or head of the household. Second SSID 331 is also a wireless gateway that controls connections to wireless access point 304. Second SSID 331 is a public SSID with which anyone with the appropriate hardware may connect, and usually does not require a key. Access to first SSID 330 cannot be gained through second SSID 331. However, second SSID 331 has its own internet connection, which can be utilized solely through second SSID 331. Memory 334 is in communication with first SSID 330 and second SSID 331. Memory 334 stores, among other things, logs, databases, and any other information necessary for first SSID 330 and second SSID 331 to function. Digital certificate 306 is also located on memory 334. Digital certificate 306 contains information such as SSID name, location, and authorizing carrier. When a mobile communications device connects to wireless access point 304, digital certificate 306 is downloaded to the mobile communications device for verification. Housing 338 encompasses first SSID 330, second SSID 331, and memory 334. Antenna 336 is coupled with housing 338, and is in communication with first SSID 330 and second SSID 331. Antenna 336 is the primary terminal for sending and receiving wireless signals.

Alternately, embodiments of the wireless access point have two memory modules for separating the first and second SSID's. Each SSID resides on its own dedicated memory module, and each SSID has its own dedicated antenna. In this embodiment, the two SSID's are completely separate. They each have their own Dynamic Host Configuration Protocol (DHCP) server, their own set of connection preferences, and their own Media Access Control (MAC) addresses. This degree of separation helps ensure that when the private SSID has a problem or goes down, the public SSID is still functional.

Other embodiments of the wireless access point employ varying degrees of separation. Some share a MAC address and DHCP server, but use separate antennas. Some share an antenna, but use different connection preferences. Some embodiments have separate SSID's but everything else is shared. Many combinations and variations are used to achieve the dual SSID wireless access point and these combinations and variations will be readily recognizable to one skilled in the art.

Figure 4:
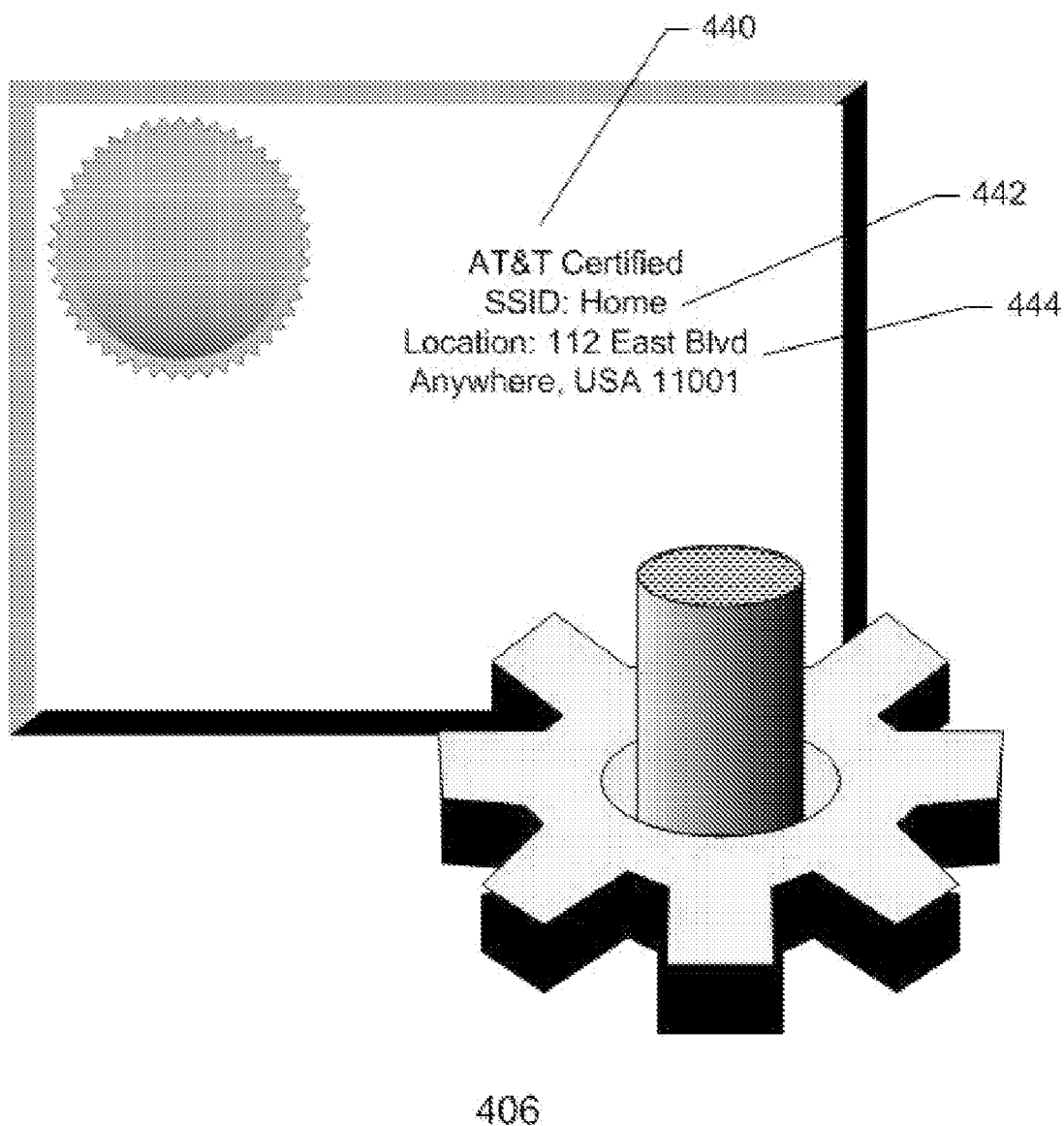
FIG. 4 shows a digital certificate, according to an exemplary embodiment of the present invention.

An exemplary embodiment of a digital certificate found onboard a wireless access point, shown in FIG. 4, features a service provider name 440, an SSID 442, and a location of the wireless access point 444. Service provider name 440 identifies the service provider which has approved the wireless access point for public use. This identification also tells the mobile communications device which service provider's database to search to find the equivalent digital certificate. SSID 442 identifies the name of the wireless access point by which the mobile communications device identifies it. Although the SSID will already be known to the mobile communications device prior to downloading the digital certificate, it serves as another method of identifying an invalid digital certificate. Location of the wireless access point 444 is most likely also known to the mobile communications device prior to downloading the digital certificate and again serves as a method of identifying an invalid certificate.

Embodiments of the digital certificate can encompass a broad range of information including location, connection type, equipment brand and model, Global Positioning System (GPS) coordinates, a photograph of the area, etc. Many indicators of authenticity will be apparent to one skilled in the art. The digital certificate is electronic in nature, and therefore may assume a range of formats. The digital certificate should be kept small in order to keep the verification process fast. A raw text or XML file should be sufficient. Encrypting the digital certificate or at least encoding it otherwise enlarges the file, but may make the certificates more difficult to counterfeit. Some elements of the digital certificate are useful if not encrypted, however, like a photograph of the area. If the user is allowed to view this photograph, on both the wireless access point and the verification copy, the user may compare the current scenery with that photograph and have another sense of security while conducting transactions through an independent wireless access point.

Figure 5:
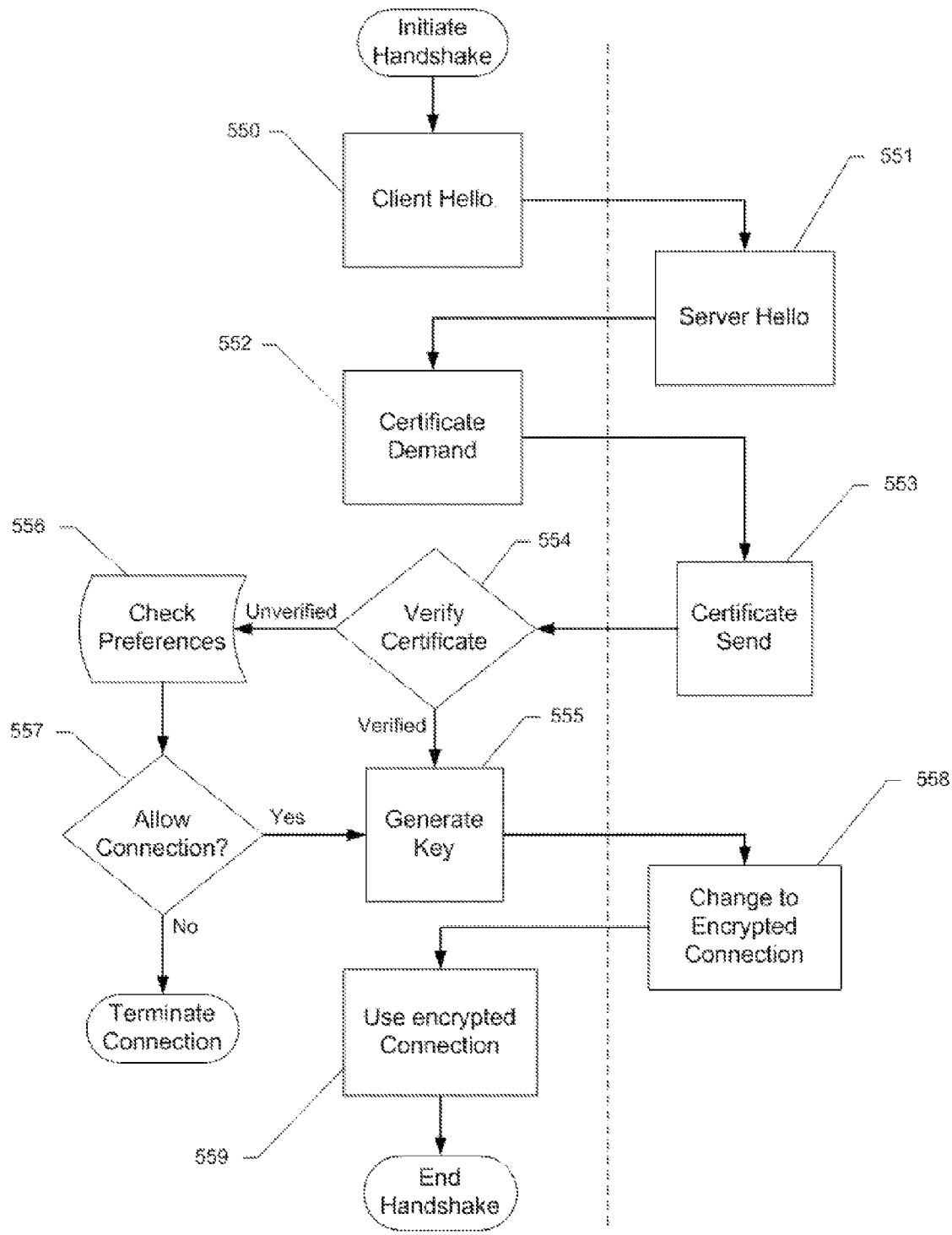
FIG. 5 shows a method of a handshake and certificate verification, according to an exemplary embodiment of the present invention.

An exemplary embodiment of a method of a handshake is shown in FIG. 5. When a mobile communications device first connects to a wireless access point the mobile communications device sends a simple message to see if it can get a response which is known as a "hello" 550. If the wireless access point understands the "hello", it responds with its own "hello" 551. Once the mobile communications device receives this "hello", it knows it is capable of communicating with the wireless access point and promptly demands a digital certificate 552. The wireless access point receives this demand and responds by sending its digital certificate to the mobile communications device 553. The mobile communications device downloads the digital certificate from the wireless access point and then seeks to verify the document with the service provider 554. A database stored within a service provider's network can be accessed via more than one connection. The mobile communications device selects a connection method using either its cellular connection RF module, BLUETOOTH module, WiFi module, etc. If the mobile communications device uses the same service provider as mentioned in the digital certificate, then the easiest way would be for the mobile communications device to use its cellular connection RF module to establish a direct data connection to the database location within the service provider's network. If the service provider is different, or if a cellular connection cannot be established at the location of the wireless access point, then an alternative connection is required. Any of the mobile communication device's other modules for connecting to the internet can be used. However, a caution should be issued before using the same wireless access point to connect to the database because the wireless access point may route the mobile communications device's connection to a phony database. If the digital certificate is verified, the mobile communications device generates a key 555 upon which it encrypts its data. The key is sent to the wireless access point. The wireless access point receives the key and switches to an encrypted connection 558. Once the wireless access point switches to an encrypted connection, the mobile communications device follows 559. However, if the digital certificate cannot be verified or fails verification then the user needs to choose whether or not to continue with the connection 557. A preset preference for this event can be stored on the mobile communications device's memory and accessed at this time 556. If the preference is to terminate communication with unverified wireless access points, then the connection terminates. If the preference is to allow unverified connections, then the key is generated and both devices switch to an encrypted connection.

Alternately, the wireless access point may want to have its own security check with the mobile communications device. In this embodiment of the handshake method, the wireless access point does not grant access automatically. While the mobile communications device is verifying the certificate from the wireless access point, the wireless access point demands a security check from the mobile communications device. This can be in the form of its Electronic Serial Number (ESN), MAC address, or perhaps a digital certificate of its own. The wireless access point takes this information and verifies it over its own connection. Once verified, and assuming the digital certificate was verified and the mobile communications device still desires an encrypted connection, the wireless access point switches to an encrypted connection and the connection can be accessed from the mobile communications device.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for ensuring the security of a wireless access point, the system comprising:
    a wireless access point including:
        a housing;
        a memory within the housing;
        a wireless communication module within the housing;
        an antenna in communication with the wireless communication module, and coupled to the housing;
        a private service set identifier (SSID) stored on the memory,
        a public SSID stored on the memory; and
        a digital authenticator stored on the memory;

wherein the public SSID is accessed by a mobile communications device via a wi-fi connection and the digital authenticator transmitted to the mobile communications device, and wherein the mobile communications device accesses a digital certificate database on a network via a cellular connection to determine the wireless access point's trustworthiness.

2. The system in claim 1, wherein the wireless communication module communicates using one of a WiFi, BLUETOOTH, and cellular protocol.

3. The system in claim 1, wherein the private SSID is not open to all users.

4. The system in claim 1, wherein the public SSID is open to all users.

5. The system in claim 1, wherein the digital authenticator comprises a service provider name, an SSID, and a physical location.

6. The system in claim 5, wherein the service provider name is the name of the service provider that has approved the wireless access point for public access.

7. The system in claim 6, wherein the SSID and physical location describe characteristics of the wireless access point.

8. The system in claim 1, wherein the memory comprises a first memory module and a second memory module.

9. The system in claim 8, wherein the private SSID resides on the first memory module.

10. The system in claim 8, wherein the public SSID resides on the second memory module.

11. A mobile communications device for ensuring the security of a wireless router having a service set identifier (SSID), the mobile communications device comprising:
   a cellular connection; and
   a wi-fi connection,
   wherein the mobile communication device accesses the SSID and downloads a certificate from the wireless router via the wi-fi connection, and
   wherein the mobile communications device accesses a digital certificate database on a network via the cellular connection to determine the wireless access point's trustworthiness.

12. The mobile communications device in claim 11, wherein the wireless communication logic communicates using one of a WiFi, BLUETOOTH, and cellular protocol.

13. The mobile communications device in claim 11, wherein the SSID is open to all users.

14. The mobile communications device in claim 11, wherein the certificate comprises a service provider name, an SSID, and a physical location.

15. The mobile communications device in claim 14, wherein the service provider name is the name of the service provider that has approved the wireless router for public access.

16. The mobile communications device in claim 15, wherein the SSID and physical location describe characteristics of the wireless access point.

17. The mobile communications device in claim 11, wherein the memory comprises a first memory module and a second memory module.

18. The mobile communications device in claim 17, wherein the first SSID resides on the first memory module.

19. The mobile communications device in claim 17, wherein the second SSID resides on the second memory module.

20. A method of proving the trustworthiness of a wireless access point having a first service set identifier (SSID) and a second SSID comprising:
   connecting to the second SSID through a first connection;
   downloading a certificate from the wireless access point; and
   comparing the certificate with a database of certificates to verify an authenticity of the wireless access point,
   wherein the comparing further comprises connecting with the database of certificates through a second connection.

21. The method in claim 20, further comprising offering an authenticator for the wireless access point to evaluate a user's trustworthiness.

22. The method in claim 20, further comprising switching to an encrypted connection.

23. The method in claim 20, wherein the first connection uses one of a WiFi, BLUETOOTH, and cellular protocol.

24. The method in claim 20, wherein the second connection uses one of a WiFi, BLUETOOTH, and cellular protocol that is not the same as the first connection.

25. The method in claim 20, wherein the comparing further comprises comparing with an internal database of certificates.

* * * * *